United States Patent [19]  
Fox et al.

[11] 4,145,296  
[45] Mar. 20, 1979

[54] WEATHER-DURABLE AQUEOUS FIRE RETARDANT STABILIZED AGAINST GELATION

[75] Inventors: Thomas U. Fox, Creve Coeur; Nelson H. Kasten, Webster Groves, both of Mo.

[73] Assignee: Monsanto Company, St. Louis, Mo.

[21] Appl. No.: 865,473

[22] Filed: Dec. 29, 1977

[51] Int. Cl.$^2$ .......................... C09K 3/28; C08L 61/28
[52] U.S. Cl. .................................. 252/8.1; 106/15.05; 252/2; 260/39 R; 260/851; 260/856; 260/DIG. 24
[58] Field of Search ................ 106/15 FP; 252/2, 8.1; 260/39 R, 851, 856, DIG. 24

[56] References Cited

U.S. PATENT DOCUMENTS

| 3,073,805 | 1/1963 | Reinhard | 526/15 |
| 3,196,108 | 7/1965 | Nelson | 252/2 |
| 3,345,289 | 10/1967 | Freifeld | 252/8.1 |
| 3,562,197 | 2/1971 | Sears et al. | 252/8.1 X |
| 3,980,140 | 9/1976 | Matsui et al. | 252/8.1 X |

*Primary Examiner*—Leland A. Sebastian  
*Attorney, Agent, or Firm*—Herman O. Bauermeister; William H. Duffey

[57] ABSTRACT

Concentrated ammonium salt compositions containing a binder and a viscosity control agent, when utilized in aqueous dispersion, are stabilized against gelation by addition of an inhibitor. The aqueous dispersion is applied to foliage, vegetation, logging slash and the like to hinder or prevent wildfires during prolonged weather exposure. Typical gelation inhibitors are morpholine, ethylenediamine and monoethanolamine.

7 Claims, No Drawings

WEATHER-DURABLE AQUEOUS FIRE RETARDANT STABILIZED AGAINST GELATION

CROSS-REFERENCE TO RELATED APPLICATION

This application is related to pending application Ser. No. 691,179 of Donald L. Brooks et al, filed May 28, 1976, now U.S. Pat. No. 4,101,485, and entitled "DURABLE FIRE RETARDANT FOR FOREST AND RANGELANDS".

BACKGROUND OF THE INVENTION

1. Field of the Invention

The present invention relates to a fire retardant for the protection of forest and rangelands which is durable against the effects of weather. Such fire retarding compositions can be applied to foliage, vegetation and logging slash in high-risk, high-value areas to hinder or prevent the occurrence of a fire rather than, as is customarily the case, being applied after a fire is underway. More particularly, this invention relates to weather-durable fire retardant compositions which remain stable and resist gelation when prepared as a dilute aqueous dispersion.

2. Description of the Prior Art

Forest fires and brush fires annually cause the loss of millions of dollars worth of timber and other property. Huge damage occurs because usually by the time the fire is detected and before control measures can be applied, it is out of control in a condition known as "wildfire". Not only is the direct property loss due to such fires catastrophic, but associated soil erosion and watershed problems are also significant. It is important, therefore, to minimize and control the spread of forest fires whenever possible.

One of the simplest and best known of fire fighting techniques is to distribute water, thickened water, or water containing a chemical fire retardant over timber and other foliage (called the "fuel") in the path of a forest fire to retard advancement of the flame front. Various methods of distributing the water, including direct spraying and aerial dropping, have been employed. Aerial dropping is advantageous since areas which are not easily accessible may be thereby treated.

According to U.S. Pat. No. 3,553,128, issued Jan. 5, 1971, there are two types of fire retardants commonly employed in fighting forest, range, grass and brushland wildfires. These fire retardants are classified as "short-term" or "long-term" retardants. Short-term retardants, as defined in U.S. Pat. No. 3,553,128, rely primarily upon the water they contain to retard combustion. Long-term retardants contain, in addition to water, a water-soluble chemical that effectively retards flaming combustion for brief periods even after the water has evaporated.

At present, the most commonly used retardant chemicals are aqueous solutions of ammonium salts such as monoammonium orthophosphate, diammonium orthophosphate, ammonium sulfate and the like.

Prior art methods and compositions for managing forest, rangeland and grass fires were largely directed to nondurable systems. Such systems and techniques were only compatible with the task of managing forest fires after the fire had started rather than attempting to prevent such fires in the first place through chemical means.

Cross-referenced application, Ser. No. 691,179, filed May 28, 1976, discloses a weather-durable fire retardant composition which when appropriately disposed in aqueous dispersion, can be applied to certain high-risk, high-value areas as a means of hindering or preventing wildfires. Such weather-durable fire retardant compositions find utility along rail and highway rights-of-way, around logging slash burn areas, campsites, power lines, etc. Weather-durability of such compositions should maintain fire retardancy against the expected primary ignition sources to be encountered in such applications. These ignition sources are small in size and are transitory, e.g., matchbook incendiary devices, hot metal fragments from railroad brake shoes, flaming carbon exhaust particles, and the like.

The weather-durable fire retardants of cross-referenced application, Ser. No. 691,179, in concentrated, nonaqueous form, comprise an ammonium salt; a reactive, water-soluble binder; and a water-dispersible, viscosity control agent.

It is an object of the present invention to provide superior stability for weather-durable fire retardant compositions employed in aqueous dispersion. A further object of the present invention is to provide such aqueous dispersions which are stabilized against gelation, i.e., against undesirable increases in viscosity of the dispersions before they are applied to the fuel. These and other objects of the present invention will become apparent from the following description.

SUMMARY OF THE INVENTION

The weather-durable fire retardants of this invention, in concentrated, nonaqueous form, comprise the following components:

(a) An ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, ammonium polyphosphates, substituted ammonium polyphosphates, amide polyphosphates, melamine polyphosphates, and mixtures thereof;

(b) a reactive, water-soluble binder which insolubilizes upon drying;

(c) a water-dispersible, viscosity control agent which imparts thixotropic flow properties to an aqueous dispersion; and (d) a gelation inhibitor:
 (i) having a thermodynamic acid dissociation (pKa) value greater than 8.0 at 25°C.; and
 (ii) being present in sufficient amount to maintain an aqueous dispersion of (a), (b) and (c) at a solution pH above about 8.5.

DESCRIPTION OF THE PREFERRED EMBODIMENTS

In a preferred embodiment of the present invention, a concentrated ammonium salt composition is first prepared, generally in a particulated, solid form. The concentrated composition comprises a mixture of one or more ammonium salts, a binder and a viscosity control agent. This concentrated composition is sometimes referred to herein as a "concentrated ammonium salt composition" or a "particulated solid concentrate composition."

To prepare a weather-durable fire retarding composition suitable for application on foliage, vegetation and the like, one can simply disperse the concentrated ammonium salt composition in a sufficient quantity of water. The gelation inhibitor of the present invention is conveniently introduced into the aqueous dispersion. Alternatively, the gelation inhibitor may be admixed with the concentrated ammonium salt composition prior to the formation of the aqueous dispersion. Corrosion inhibitors, dyes and other well-known additives may be present in the concentrate or in the final aqueous dispersion.

The ammonium salt of the present compositions is selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, ammonium polyphosphates, substituted ammonium polyphosphates, amide polyphosphates, melamine polyphosphates, and mixtures thereof. Typical mixed cation salts include $NH_4MHPO_4$, $(NH_4)_2MPO_4$ and $NH_4M_2PO_4$ wherein M is an alkali metal cation, preferably sodium or potassium. Magnesium ammonium phosphate exemplifies an alkaline earth metal ammonium phosphate.

The ammonium polyphosphates useful as the ammonium salt of this invention can be of various known types. Preferred ammonium polyphosphates are the substantially water-insoluble type represented by the formula

$$H_{(n-m)+2}(NH_4)_mP_nO_{3n+1}$$

wherein n is an integer having an average value between 20 and about 400, m/n has an average value between 0.7 and about 1.1, and m has a maximum value equal to n+2. The physical characteristics of these ammonium polyphosphates and the various processes for preparing them are described in U.S. Pat. No. 3,397,035 dated August 13, 1968. The average value of n in the foregoing formula is determined by the end group titration method [Van Wazer et al, *Anal. Chem.* 26, 1755 (1954)].

The substantially water-insoluble ammonium polyphosphates described in the above formula can be prepared by heat treating phosphates such as urea phosphate with a combined ammoniating and condensing agent such as urea or melamine.

Illustrative but nonlimiting examples of other ammonium polyphosphates useful herein are hexammonium tetrapolyphosphates described in U.S. Pat. No. 3,314,751 to Griffith; ammonium pyrophosphates described in U.S. Pat. No. 3,645,675 to Sears et al; long-chain crystalline ammonium polyphosphates described in U.S. Pat. No. 3,912,802 to McCullough et al; and anhydrous ammonium polyphosphates described in U.S. Pat. No. 3,333,921 to Knollmueller.

Nonlimiting examples of substituted ammonium polyphosphates useful herein are mixed cation ammonium potassium polyphosphates described in U.S. Pat. No. 3,549,347 to Lyons et al; potassium ammonium polyphosphates described in U.S. Pat. No. 3,911,086 to Sheridan et al; and substituted ammonium polyphosphates described in U.S. Pat. No. 4,043,987.

Typical amide polyphosphates are described in U.S. Pat. No. 3,926,990 and U.S. Pat. No. 3,969,291, both to Fukuba et al.

Melamine polyphosphates, sometimes known as melamine pyrophosphates, are described in U.S. Pat. No. 4,003,861 to Savides et al.

The reactive, water-soluble binder employed in this invention becomes insoluble upon drying of the aqueous composition on the fuel surface. The binder is referred to as "reactive" because it reacts with itself as well as with other components of the composition.

Exemplary binding agents useful in the weather-durable fire retardant compositions of this invention are melamine resins such as trimethylol melamine. Melamine resins are particularly useful because they are readily soluble and their polymer network affords greater durability of the fuel surface coating, both physically and chemically.

Examples of other suitable substituted melamine binders include dimethylol melamine, tetramethylol melamine, pentamethylol melamine, hexamethylol melamine, mixtures of these methylol melamines, mixtures of these melamines and formaldehyde or melamine or methylol melamine. Methylated guanamines and modified methylol melamines such as the trimethyl ether of trimethylol melamine are also useful.

Further examples of useful binders are dimethylol dihydroxy ureas. Suitable cyclic alkylene ureas include dimethylol ethylene urea, dimethylol propylene urea, and the like. Further examples include methylol derivatives of dicyandiamide, glyoxal reaction products of any of the above, carbamates, N-methylol derivatives, etc.

When reference is made herein to the "viscosity control agent," it is to be understood that the agent's functionality is not one of viscosity control alone. For reasons not entirely understood, superior results have been achieved through use of certain viscosity control agents which impart thixotropic flow properties to the final aqueous composition to be dispensed on the fuel, e.g., foliage, logging slash, etc. Required full-season weather durability has been achieved together with surprising retention of fire retarding efficiency on the fuel. These effects are achieved even when the absolute viscosity of the final aqueous formulation is unusually low, e.g., 20 centipoises. This points up the essential factor of rheology in placement and formation of the fire retarding composition upon the fuel surface.

While not to be construed in a limiting sense, preferred viscosity control agents for use herein are cross-linked interpolymers of $C_2$–$C_4$ olefins and maleic anhydride. Particularly effective results have been achieved with ethylene-maleic anhydride interpolymers.

Preparation of cross-linked ethylene-maleic anhydride interpolymers is described in U.S. Pat. Nos. 3,073,805 and 3,165,486. Thus, many cross-linking agents are known for use in the production of cross-linked $C_2$–$C_4$ olefin-maleic anhydride interpolymers. Vinyl esters of crotonic acid such as vinyl crotonate have found considerable utility in this regard. See U.S. Pat. No. 3,165,486. Also see U.S. Pat. No. 3,951,926 wherein ethylene-maleic anhydride interpolymers are cross-linked with determined amounts of triallyl isocyanurate.

Other viscosity control agents useful in this invention are cross-linked polyacrylic acids; certain natural and modified bentonite clays; cellulose derivatives such as hydroxycellulose and carboxymethylcellulose; and the like, so long as they impart the necessary thixotropic flow properties to the aqueous compositions. Guar gum, for example, did not demonstrate satisfactory performance herein.

Weather-durability of the aforementioned fire retardant compositions was demonstrated in cross-referenced application Ser. No. 691,179. Thus, aqueous dispersions of the concentrated ammonium salt compositions were spray-applied onto a fuel basket containing either Ponderosa pine needles or Aspen excelsior. The treated fuel basket was then subjected to a determined amount of simulated rainfall. After the fuel basket contents were allowed to dry, the tendency to burn, or to resist burning, was measured.

As hereinbefore stated, the present invention imparts stability to the final aqueous dispersion by resisting any tendencies of the dispersion to thicken or form a gel upon standing and prior to application on the fuel. Such improved viscosity stability of the final dispersions is valuable in field application work. The dispersion is thus permitted to stand for longer periods of time before actual application to foliage, vegetation or logging slash. More flexibility is thereby afforded in field use of these weather-durable fire retarding compositions.

Improved viscosity stability of these aqueous dispersions is achieved by the incorporation therein of a small but effective amount of a gelation inhibitor having characteristics as hereinafter defined.

Gelation inhibitors useful herein are limited to those having a thermodynamic acid dissociation constant (pKa) value at 25° C. of greater than 8.0. Determination methods and tabulations of pKa values are found in *Buffers for pH and Metal Ion Control*, by Perrin and Dempsey, published by Chapman and Hall, Ltd., London (1974).

Thermodynamic acid dissociation constants for various nitrogen-containing buffering compounds are as listed below. Only those compounds having a constant greater than 8.0 are within the present invention.

| Compound | pKa at 25° C. |
| --- | --- |
| N-Ethylmorpholine | 7.67 |
| Triethanolamine | 7.76 |
| Triisopropanolamine | 7.86 |
| N-Methyldiethanolamine | 8.52 |
| Diethanolamine | 8.88 |
| Ammonia | 9.25 |
| Ethanolamine | 9.50 |
| Trimethylamine | 9.80 |
| Ethylenediamine | 9.93 |
| Methylamine | 10.62 |
| Ethylamine | 10.63 |
| n-Butylamine | 10.64 |
| Triethylamine | 10.72 |
| Dimethylamine | 10.77 |
| Diethylamine | 10.93 |
| Piperidine | 11.12 |

Morpholine, ethylenediamine and monoethanolamine are exemplary gelation inhibitors of this invention. Monoethanolamine is a preferred inhibitor.

Morpholine, also known as tetrahydro-p-oxazine, is a colorless liquid. Monoethanolamine, also known as 2-aminoethanol, is also a colorless liquid. Ethylenediamine, also known as diaminoethane, assumes the form of colorless crystals which are soluble in water. Because of the varying physical forms of the respective gelation inhibitors of this invention, the manner of introduction into the final aqueous solution depends upon the particular choice. This factor will be more clearly understood from the following description of preferred methods of preparing compositions and dispersions of the present invention.

The concentrated ammonium salt composition can readily be prepared according to numerous convenient procedures, including simply blending or mixing together appropriate amounts of the respective dry ingredients. Thus, the ammonium salt (or salt mixture) can be admixed with the reactive water-soluble binder. To that admixture may be then added the water-dispersible viscosity control agent which imparts thixotropic flow properties to the ultimate aqueous dispersion. Order of addition of these first three constituents is noncritical.

In addition, a flow conditioner can be advantageously incorporated within the dry concentrate to facilitate subsequent handling and transfer. Other additives such as corrosion inhibitors and coloring agents may be conveniently incorporated into the dry concentrate.

Concentration of the ammonium salt (or salt mixture) within the particulated solid concentrate compositions may vary within broad limits depending upon the particular application involved. Thus, the ammonium salt (or mixture of such salts) will usually comprise from about 20 percent to about 70 percent by weight of the essential components of the dry concentrate. Preferably, the ammonium salt comprises from about 30 percent to about 60 percent by weight of said concentrate, i.e., the combined weight of binder, viscosity control agent and ammonium salt (or salt mixture).

Weight concentration of the water-soluble binder in the particulated solid concentrate compositions of this invention is often about the same as that of the ammonium salt (or mixture of ammonium salts). It is to be understood, however, that the binder concentration may be allowed to vary as dictated by the conditions of application and weather exposure on the fuel. Typically, the binder comprises from about 20 to about 70 percent by weight of the dry concentrate, usually about 30 to 60 percent.

Weight concentration of the viscosity control agent within the dry concentrate can be comparatively low while still permitting the ultimate achievement of durable fire retardance. Successful results are obtained with about 1 to about 20, preferably 3 to 15, percent by weight of viscosity control agent in the concentrated ammonium salt composition. Higher or lower amounts may be desirable for various applications, depending to some extent on the specific agents employed. Thus, the ethylene-maleic anhydride copolymer may be effective when present in as little as 0.5 percent by weight of the dry concentrate.

For ease of handling, it is often more practical and convenient to introduce the gelation inhibitor into an aqueous dispersion of the three-component concentrated ammonium salt compositions. However, when it is desired to incorporate the gelation inhibitor into the dry concentrate, the inhibitor is typically present in from about 7 to 40 percent of the dry concentrate, preferably about 15 to 35 percent. Higher or lower amounts may be desirable for certain applications, depending to some extent on the specific constituents in the dry concentrate as well as the specific gelation inhibitor utilized.

When preparing the concentrated ammonium salt compositions for field application from ground tankers or helicopters, large amounts of water are employed such that the concentrate, together with the gelation inhibitor if the latter is separately introduced, then represents only a minor portion of the final aqueous dispersion, e.g., about 5 to about 40 percent by weight, often about 10 to 20 percent. Maximum presence of the soluble ammonium salt (or salt mixture) is governed in part by saturation limits. Typically, the ammonium salt (or salt mixture) will constitute about 2 to 20 percent by weight of the aqueous dispersion, preferably about 3 to 10 percent. Binder presence is approximately the same as that of the ammonium salt.

Presence of the thixotropic viscosity control agent within the aqueous dispersion can vary, for example, from about 0.1 to 5 percent by weight, preferably from about 0.2 to about 1.5 percent.

Presence of the gelation inhibitor within the aqueous dispersion can vary, for example, from about 1 to 7 percent by weight, preferably from about 2 to about 5 percent. Concentration of the inhibitor is governed in part by the desired minimum pH of 8.5.

To illustrate the surprising performance improvement achieved with gelation inhibitors of the present invention, stabilization tests were conducted on aqueous dispersions containing various types and classes of additives. Among the additives tested were dimethyl formamide, hexamethylene tetramine, urea, triethanolamine, ammonia, ammonium hydroxide, ammonium carbonate, potassium hydroxide, tetrasodium pyrophosphate, disodium phosphate and trisodium phosphate.

Superiority of morpholine, ethylenediamine, monoethanolamine and other compounds having a pKa constant greater than 8.0 will be apparent from the following comparative examples. A preferred pKa range for gelation inhibitors of this invention is 8.0 to 11.0.

The aqueous dispersions of this invention are necessarily handled under diverse conditions of field application, often at remote or difficultly accessible sites. Stabilization of the aqueous dispersions against gelation for reasonable periods of time is clearly advantageous for achieving uniform application of the dispersions under typical field use conditions. While the dispersions can often be mechanically agitated to resist or prevent gelation, it is advantageous to inhibit gelation through chemical means.

Ideally, optimum stabilization of such aqueous dispersions would result in minimum viscosity changes over a 24 hour period. Lesser stability times, of course, are acceptable although there is a convenience penalty in applying the dispersions as the resistance to gelation decreases.

A stabilization time of 4 hours was chosen herein as appropriate and desirable for most field application procedures. Successful achievement of this targeted stabilization period was deemed to occur if the dispersion viscosity remained within the range of 600 ± 200 centipoises throughout a 4 hour test.

The following Example 1 illustrates the preparation of a weather-durable aqueous dispersion having fire retarding properties, but containing no gelation inhibitor. This dispersion is referred to hereinafter as the "Control" dispersion.

All parts and percentages expressed hereinafter are understood to be by weight unless otherwise specified.

EXAMPLE 1

In the first step, a concentrated ammonium salt composition was prepared in particulated solid form. The ammonium salt was an admixture of 9.0 grams diammonium orthophosphate and 9.4 grams of substantially water-insoluble ammonium polyphosphate having the formula

$$H_{(n-m)+2}(NH_4)_m P_n O_{3n+1}$$

The reactive water-soluble binder, present in 18.7 grams, was "Resloom HP," a commercial trimethylolated melamine resin, available from Monsanto Company. The water dispersible viscosity control agent was a cross-linked ethylene-maleic anhydride polymer, present in 3.4 grams. The properties of this copolymer were such as to produce a Brookfield viscosity of about 8,500 centipoises when dispersed at a 2 percent concentration in an aqueous solution. The aforementioned solid components were then mixed with 259.5 grams of deionized water to produce an aqueous dispersion having a pH of 6.6 and having a Brookfield LVT viscosity of 590 centipoises using a No. 4 Spindle at 60 rpm. All viscosity readings set forth hereafter relate to the same instrumentation basis. The "Control" aqueous dispersion thus prepared had the following composition:

| Component | Percent |
|---|---|
| Ammonium polyphosphate | 3.1 |
| Diammonium phosphate | 3.0 |
| Trimethylolated melamine | 6.2 |
| Ethylene-maleic anhydride copolymer | 1.1 |
| Water | 86.6 |

Viscosity increase of the Control dispersion of Example 1 versus storage time under ambient conditions is presented in Table I below.

TABLE I

| VISCOSITY OF CONTROL DISPERSION | |
|---|---|
| Elapsed Time | Viscosity in Centipoises |
| 0 | 590 |
| 6 Min. | 680 |
| 1 Hr. | 1225 |
| 4 Hrs. | 4950 |

To illustrate the superior gel inhibition achieved with stabilizers of the present invention, monoethanolamine, which has a pKa value of 9.50 at 25° C, was added to the aqueous control dispersion of Example 1 at percentage levels of 1.5, 2 and 3 percent, respectively, based upon the weight of the dispersion. The significant improvement in viscosity stability is apparent from the results in Table II below. Increased pH is also apparent.

TABLE II

| STABILIZED & UNSTABILIZED VISCOSITIES | | | | | |
|---|---|---|---|---|---|
| | Viscosity in Centipoises | | | | |
| | | With Monoethanolamine (MEA) | | | pH |
| Elapsed Time | Control | Present At | | | (MEA |
| | | 1.5% | 2% | 3% | At 3%) |
| 0 | 590 | 610 | 650 | 625 | 9.3 |
| 6 Min. | 680 | 625 | 700 | 700 | 9.2 |
| 1 Hr. | 1225 | 760 | 750 | 700 | 9.1 |
| 4 Hrs. | 4950 | 1125 | 925 | 750 | 9.1 |
| 21-28 Hrs. | — | — | — | 1150 | 8.7 |

The outstanding gel inhibition afforded by additives of the present invention is further illustrated by performance comparisons with amides, phosphates, urea, other amines, etc. Following the procedure described above, four-hour stabilization tests were conducted on the same aqueous control dispersion prepared in Example 1 above, and using additives both within and without the scope of the present invention. Increases in dispersion viscosity resulting from these comparative tests are set forth in Table III below wherein the various additives were present in 3 percent weight concentration.

TABLE III

| | EFFECT OF VARIOUS ADDITIVES | | | | | |
|---|---|---|---|---|---|---|
| | Initial Dispersion | Viscosity in centipoises at | | | | |
| Additive | pH | 0 | 6 Min. | 1 Hr. | 4 Hrs. | 21-28 Hrs. |
| None - Control | 6.6 | 590 | 680 | 1225 | 4950 | — |
| Dimethyl formamide | 6.7 | 475 | 500 | 900 | 3100 | — |
| Morpholine | 8.7 | 550 | 525 | 725 | 800 | 2700 |
| Ethylenediamine | 9.5 | 450 | 500 | 525 | 500 | 1050 |
| Hexamethylene tetramine | 6.7 | 500 | 550 | 950 | 2000 | — |
| Urea | 6.6 | 600 | 650 | 800 | 1800 | — |
| Triethanolamine | 7.6 | 600 | 650 | 900 | 1500 | — |
| Ammonium carbonate (20%) | 7.0 | 475 | 575 | 850 | 1900 | — |
| Ammonium carbonate (100%) | 8.2 | 300 | 350 | 525 | 800 | gel |
| Potassium hydroxide (20%) | 7.3 | 575 | 675 | 950 | 1550 | — |
| Potassium hydroxide (100%) | 9.5 | 400 | 450 | 525 | 575 | 1450 |
| Ammonium hydroxide | 9.3 | 400 | 400 | 550 | 575 | 750 |
| Tetrasodium pyrophosphate . 10H$_2$O | 7.2 | 500 | 600 | 900 | 1300 | — |
| Disodium phosphate . 7H$_2$O | 7.0 | 500 | 600 | 975 | 2100 | — |
| Trisodium phosphate . 12H$_2$O | 7.7 | 450 | 600 | 850 | 1500 | — |
| Disodium phosphate anhydrous | 7.2 | 425 | 550 | 875 | 1900 | — |
| Disodium phosphate (anhydrous) + sodium hydroxide | 8.3 | 100 | 250 | 500 | 1000 | — |
| Diethanolamine | 9.0 | 600 | — | 750 | 875 | — |
| Piperidine | 9.9 | 600 | 650 | 725 | 800 | — |

It can be seen from Tables II and III that monoethanolamine, morpholine and ethylenediamine, all being additives within the present invention, are superior gel inhibitors for weather-durable aqueous dispersions of the type utilized herein. Urea, the phosphates, ammonium carbonate, triethanolamine and numerous other additives failed to provide the superior stability afforded by those inhibitors of the present invention. Potassium hydroxide (100%) and ammonium hydroxide also provide good stabilization results. These inhibitors are within the present invention. They are not as easily handled, however, as the preferred amine inhibitors.

Although ammonium carbonate provided desirable short term stabilization, longer term storage of the resulting aqueous dispersion gave evidence of polymerization and gas evolution.

It is desirable to employ a sufficient concentration of the gelation inhibitor in the aqueous dispersion to maintain pH control of the dispersion above about 8.5, preferably from 8.5 to about 10.5.

It has been found that the gelation inhibitors of the present invention, when employed in small but effective amounts in weather-durable aqueous fire retarding dispersions, do not materially detract from fire retarding performance of the uninhibited control dispersion. Thus, a significant improvement in viscosity stability is achieved without sacrifice of fire retarding efficiency or weather-durability.

While this invention has been described with respect to specific examples and embodiments, it is to be understood that the invention is not limited thereto and that it can be variously practiced within the scope of the following claims.

The embodiments of this invention in which an exclusive property or privilege is claimed are defined as follows:

1. A concentrated ammonium salt composition suitable for use in the preparation of aqueous weather-durable fire retardants which comprises:
    (a) An ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, ammonium polyphosphates, substituted ammonium polyphosphates, amide polyphosphates, melamine polyphosphates, and mixtures thereof;
    (b) a reactive, water-soluble binder which insolubilizes upon drying;
    (c) a water-dispersible, viscosity control agent which imparts thixotropic flow properties to an aqueous dispersion of said composition; and
    (d) a gelation inhibitor:
        (i) having a thermodynamic acid dissociation (pKa) value greater than 8.0 at 25° C.; and
        (ii) being present in sufficient amount to maintain an aqueous dispersion of (a), (b) and (c) at a solution pH above about 8.5.

2. A concentrated ammonium salt composition suitable for use in the preparation of aqueous weather-durable fire retardants which comprises:
    (a) From about 20 to 70 percent by weight of an ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, ammonium polyphosphates, substituted ammonium polyphosphates, amide polyphosphates, melamine polyphosphates, and mixtures thereof;
    (b) from about 20 to 70 percent by weight of a reactive, water-soluble binder which insolubilizes upon drying;
    (c) from about 1 to 20 percent by weight of a water-dispersible, viscosity control agent which imparts thixotropic flow properties to an aqueous dispersion of said composition; and
    (d) from about 7 to 40 percent by weight of a gelation inhibitor:
        (i) having a thermodynamic acid dissociation (pKa) value greater than 8.0 at 25° C.; and
        (ii) being present in sufficient amount to maintain an aqueous dispersion of (a), (b) and (c) at a solution pH above about 8.5.

3. A concentrated ammonium salt composition suitable for use in the preparation of aqueous weather-durable fire retardants which comprises:
    (a) From about 30 to 60 percent by weight of an ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, substantially water-insoluble ammonium polyphosphates, and mixtures thereof, wherein said ammonium polyphosphates are represented by the formula $$H_{(n-m)+2}(NH_4)_m P_n O_{3n+1}$$

wherein n is an integer having an average value between 20 and about 400, m/n has an average value between about 0.7 and about 1.1, and m has a maximum value equal to n+2;

(b) from about 30 to 60 percent by weight of a melamine resin binder;

(c) from about 3 to 15 percent by weight of a water-dispersible viscosity control agent which imparts thixotropic flow properties to an aqueous dispersion; and (d) from about 15 to 35 percent by weight of a gelation inhibitor:
 (i) having a thermodynamic acid dissociation (pKa) value between 8.0 and 11.0 at 25°C.; and
 (ii) being present in sufficient amount to maintain an aqueous dispersion of (a), (b) and (c) at a solution pH between about 8.5 and about 10.5.

4. A composition of claim 3 wherein the ammonium salt is diammonium orthophosphate, ammonium polyphosphate, or a mixture thereof; the interpolymer is ethylene-maleic anhydride or cross-linked polyacrylic acid; and the gelation inhibitor is monoethanolamine, morpholine or ethylenediamine.

5. A weather-durable fire retardant composition which comprises an aqueous dispersion of (a) An ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, ammonium polyphosphates, substituted ammonium polyphosphates, amide polyphosphates, melamine polyphosphates, and mixtures thereof;

(b) a reactive, water-soluble binder which insolubilizes upon drying;

(c) a water-dispersible, viscosity control agent which imparts thixotropic flow properties to an aqueous dispersion; and (d) a gelation inhibitor:
 (i) having a thermodynamic acid dissociation (pKa) value greater than 8.0 at 25°C.; and
 (ii) being present in sufficient amount to maintain an aqueous dispersion of (a), (b) and (c) at a solution pH above about 8.5 wherein (a), (b), (c) and (d) together comprise from about 5 to 40 percent by weight of said aqueous dispersion.

6. An aqueous weather-durable fire retardant composition which comprises:

(a) From about 2 to 20 percent by weight of an ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, substantially water-insoluble ammonium polyphosphates, and mixtures thereof, wherein said ammonium polyphosphates are represented by the formula $$H_{(n-m)+2}(NH_4)_m P_n O_{3n+1}$$

wherein n is an integer having an average value from 20 to about 400, m/n has an average value between about 0.7 and about 1.1, and m has a maximum value equal to n+2, (b) from about 2 to 20 percent by weight of a reactive, water-soluble binder which insolubilizes upon drying;

(c) from about 0.1 to 5 percent by weight of a water-dispersible viscosity control agent which imparts thixotropic flow properties to said composition; and (d) from about 1 to 7 percent by weight of a gelation inhibitor:
 (i) having a thermodynamic acid dissociation (pKa) value between 8.0 and 11.0 at 25°C.; and
 (ii) being present in sufficient amount to maintain an aqueous dispersion of (a), (b) and (c) at a solution pH between about 8.5 and about 10.5.

7. An aqueous composition of claim 6 wherein the ammonium salt is diammonium orthophosphate, ammonium polyphosphate, or a mixture thereof; the binder is a melamine resin; the viscosity control agent is a cross-linked $C_2$–$C_4$ olefin-maleic anhydride interpolymer or cross-linked polyacrylic acid; and the gelation inhibitor is monoethanolamine, morpholine or ethylenediamine.

* * * * *